United States Patent [19]

Tracy

[11] 4,150,492
[45] Apr. 24, 1979

[54] PRECISION LEVEL

[76] Inventor: Alan C. Tracy, 1335 N. Utah Ave., Davenport, Iowa 52804

[21] Appl. No.: 867,989

[22] Filed: Jan. 9, 1978

[51] Int. Cl.² .............................................. G01C 9/28
[52] U.S. Cl. .................................................... 33/376
[58] Field of Search ........................... 33/338, 374–376

[56] References Cited

U.S. PATENT DOCUMENTS

| | | | |
|---|---|---|---|
| 1,094,651 | 4/1914 | Hayden | 33/376 |
| 1,278,148 | 9/1918 | Heusser | 33/375 |
| 2,057,404 | 10/1936 | Whalstrom et al. | 33/376 X |
| 3,307,269 | 3/1967 | Karstens | 33/301 |

*Primary Examiner*—Charles E. Phillips
*Attorney, Agent, or Firm*—Glenn H. Antrim

[57] ABSTRACT

A precision level is the type that has a level indicating means and is turned end for end to determine the amount one point on which the end of the level rests must be changed in height with respect to a point at the other end of the level to have the points on a horizontal line. A mounting through one end of the main body of the present level positions a conventional differential dial indicator above a foot that is adjustable in height, and the sensing stem of the indicator follows the upper end of the foot to show the amount the points must be changed in height to position the points on a horizontal line. For levels of different lengths, sections for the main body are connected together. Latching assemblies for joining the sections have hook-shaped members mounted on eccentric pins, the pins being rotated to pull the sections tightly together.

4 Claims, 7 Drawing Figures

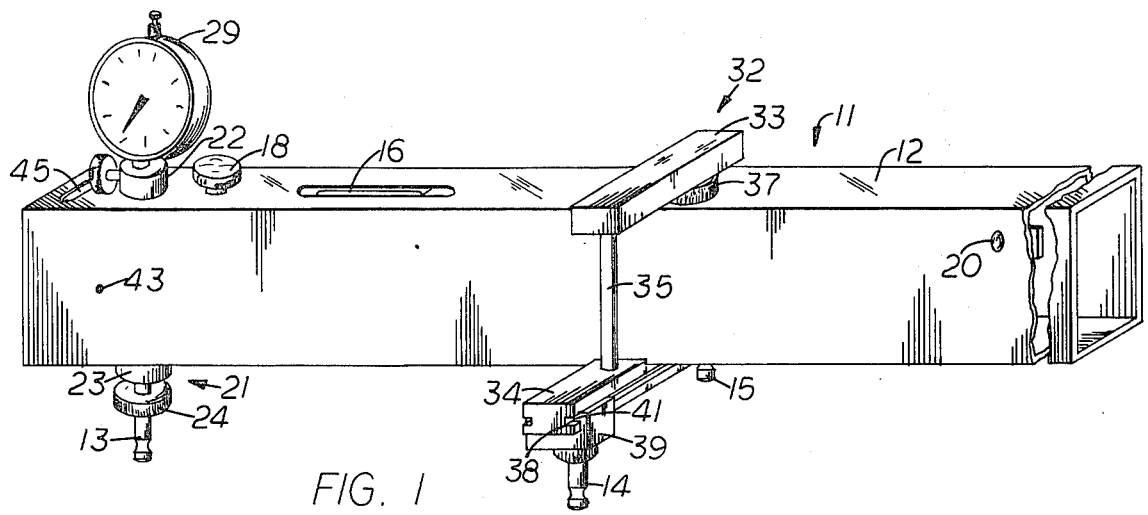
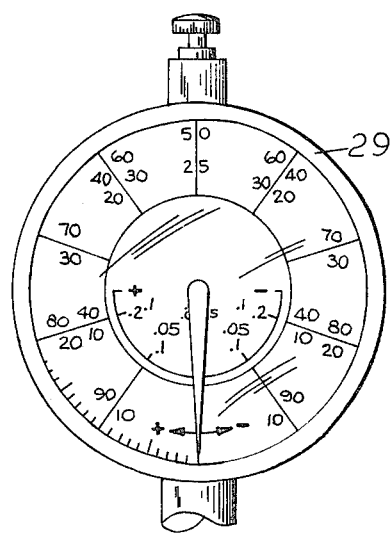
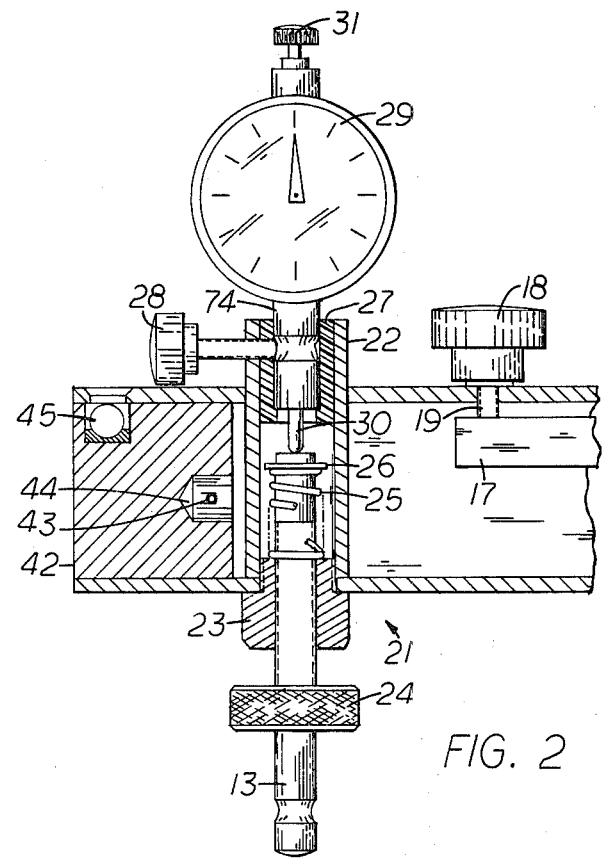
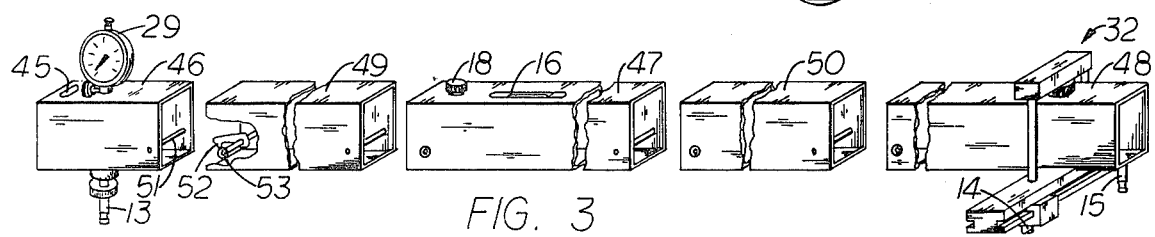

PRECISION LEVEL

BACKGROUND OF THE INVENTION

This invention relates to levels for determining how much the heights of two spaced points of a surface or of respective related surfaces must be changed to position the points precisely on a horizontal line.

The prevalent levels or spirit levels used in carpentry have bubble vials that are fixed in respective bars or beams. The vials are adjusted with respect to the main bodies of the levels only initially or occasionally for determining either level surfaces or inclined surfaces at fixed angles. Means are not provided for determining accurately how much the structural members must be moved or tilted to obtain the desired position.

Levels that are more precise than those used in carpentry are required for such uses as the leveling of machine tools and the aligning of two adjacent machines that have interconnecting drive shafts. The bubble vials in precision levels are made to be sensitive enough to show much smaller changes of inclination than the changes required to be shown by the vials of usual levels. For calibration and for measuring slightly different inclinations, the vials are mounted on respective pivoted members to permit accurately controlled variations in the inclinations of the vials with respect to the respective main bodies of the levels. Levels permitting variations by screw adjustments are shown in U.S. Pat. No. 3,307,269 issued to E. S. Karstens on Mar. 7, 1967.

In addition to having adjustable vials, precision levels have means for measuring the difference in heights of two points or how far the points are off level. For example, in a level according to the Karstens patent mentioned above, each end of the main body of the level is supported above a point by a bracket assembly and has a screw for setting accurately the height of the end of the main body above one of two points that are being compared in height. While the level is in a first position to be supported over the two points, the inclination of the vial is adjusted until its bubble is in a reference position. The level is then turned end for end to support the level over the two points, and the screw at one end or the screws at both ends for adjusting the height of the respective ends of the main body are adjusted until the bubble in the vial is again at the reference position. Micrometer means connected between the body of the level and the supporting means where the height is adjusted provides a reading in the change in height between the end of the body of the level and the point supporting that end. Since this reading is twice the difference in the heights of the two points, the micrometer means at one end of the level is then adjusted for a change of reading of one-half of the change in reading that was required to position the bubble at the reference position immediately after the level had been reversed. If the two points are on separate structures, the height of one or both of the structures is changed until the change in height between the two is equal to this one-half reading displayed on the micrometer means. If the procedure has been performed accurately, the bubble is returned to its reference position by the adjustment in height of the structures. The points should then be at the same level, and the accuracy of the leveling can be determined by again reversing the level to its original position and checking to see if the bubble is still at its reference position.

SUMMARY OF THE INVENTION

A level according to this invention has a vertical mounting member through one end of the main body or beam of the level. A foot for supporting the end of the level is threaded and is turned into the lower end of the mounting member. A conventional indicator for measuring accurately small differences in distance is positioned in the upper end of the mounting member and has a sensing stem that bears against the upper end of the foot. The distance between the end of the main body of the level and the surface on which it is supported is varied accurately by turning the foot, and the indicator displays the change in distance as the stem of the indicator follows the change in height of the top of the foot. As in prior levels as described above, an accurate, sensitive spirit vial is mounted in a holder that has at one end a pivot and at its other end an adjusting screw for accurately varying the tilt of the vial with respect to the main body.

The end of the level opposite the end having an adjustable foot and indicator is supported by an assembly that is movable along the main body. A transverse bar of the assembly is positioned below the main body and has a tongue and groove support for a pair of feet. Each foot of the pair of feet is movable along the transverse bar to position it at a desired distance beyond the center of the main body. When the level is to be supported on curved surfaces, an attachment having an inverted V-shaped lower surface may be connected to the lower ends of the pair of feet, and a similar attachment connected to the foot that is below the indicator.

A level suitable for leveling the tables of small machinery may conveniently have a single piece of rectangular tubing for a main body. Long levels for positioning separated pieces of large machinery at the same heights comprise several sections of rectangular tubing to be connected end to end for a main body having a length of several meters. Sections are connected securely so that the downward deflection between the supporting feet of the level caused by the weight of the intermediate portions of the level is minimum. Since the center of a uniform body tends to remain in the same direction regardless of the deflection caused by its weight, the vial of the level is mounted in a separate section, and this section is always placed at the center of the body.

Adjacent sections are connected by a latch. One end of a section has a latching member and an adjacent end has a fixed pin between its sides. One end of the latching member is pivotally connected to an eccentric pin, and the other end has a hook to be positioned about the fixed pin. After the hook is in position about the pin, the latching member is moved longitudinally by turning the eccentric pin to bring the sections tightly together.

BRIEF DESCRIPTION OF THE DRAWING

FIG. 1 is a perspective view showing a side and the top of a level of a single section according to this invention;

FIG. 2 is a cross-sectional view of one end of the level of FIG. 1 to show a mounting for a foot and a distance indicator;

FIG. 3 is an exploded perspective view of a level comprising several sections;

FIG. 7 is a front view of a dial indicator of the level to show a preferred reading for a scale.

DESCRIPTION OF THE PREFERRED EMBODIMENTS

Figure 4:
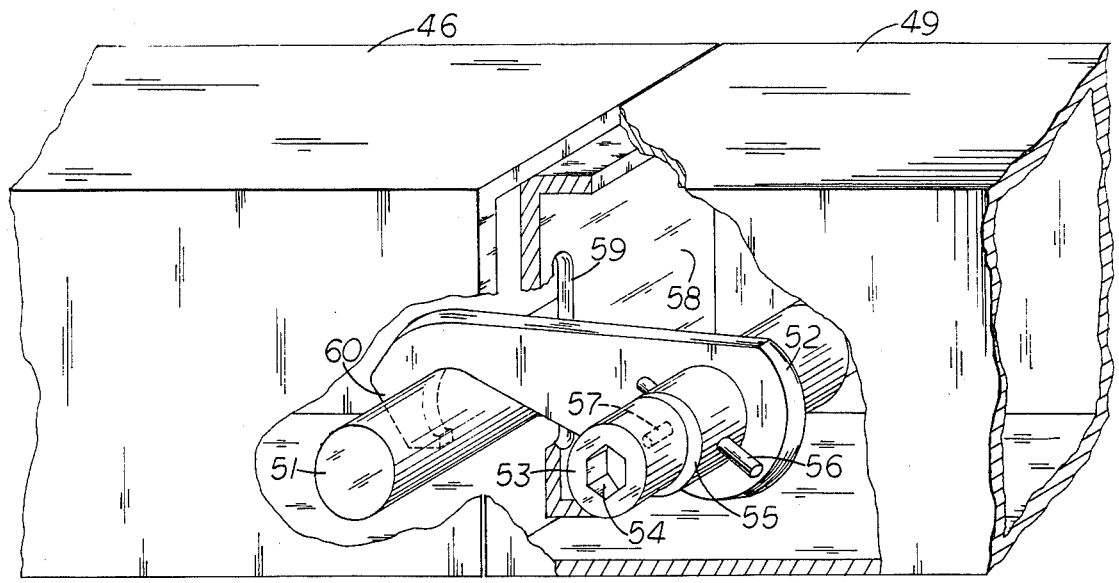
FIG. 4 is a cutaway, perspective view of adjacent ends of two sections to show the latching means for fastening the sections together.

The level 11 of FIG. 1 has a main body or beam 12 fabricated from rectangular tubing. A leg 13 extends below the middle of one end of the main body 12 and is adjustable for varying over a limited range the inclination of the main body with respect to the surface that is being leveled. The other end of the level is supported on a pair of legs 14 and 15 that are spaced transversely below the main body 12.

A bubble vial 16 that is sensitive to very small changes of inclination is positioned below a window within the top wall of the rectangular tubing 12. One end of a holder or elongated member 17 (FIG. 2) for holding the vial 16 is connected to the upper wall of the rectangular tubing 12 by an adjustable screw member 19 having a knob 18, and the other end of the holder is pivotally mounted on a pin 20 (FIG. 1) that extends across the rectangular tubing 12.

A mounting 21 for receiving the leg 13 has a main, cylindrical portion 22 extending through a hole in the upper wall of the rectangular tubing 12 and resting on the inside surface of the lower wall of the tubing. A shoulder screw 23 (FIG. 2) has an external thread that is turned into the lower portion of the cylindrical portion 22 and a central bore that is threaded for receiving a central threaded portion of the leg 13. A round knob 24 for turning the leg 13 is concentrically and rigidly fixed to the leg 13 at a point above the end of the leg 13 that is to rest on a surface to be level and below low the threaded portion and is turned into the shoulder screw 23. The upper end of the leg 13 extends into a cylindrical cavity within the cylindrical portion 22 of the mounting. A helical coil spring 25 is positioned about the upper end of the leg 13 and has an upper end bearing against a retaining washer 26 that is fixed to the upper end of the leg 13 and a lower end bearing against the upper end of the shoulder screw 23. The spring 25 urges the leg 13 upwardly to remove any inaccuracy due to looseness in the threads between the leg 13 and the shoulder screw 23.

A bushing 27 (FIG. 2) within the upper end of the cylindrical portion 22 of the mounting has the required inside diameter for receiving the mounting stem 74 of a differential distance dial indicator 29. A thumb screw 28 extends through a threaded hole in the upper end of the cylindrical portion 22 and radially through the bushing 27. The indicator 29 is retained in the mounting 21 against a lower inside shoulder by tightening the thumb screw 28 for pressing its inner end in an angular groove about the stem 74, the end of the thumb screw bearing against a lower inclined surface of the groove. When the indicator is positioned in the top of the mounting 21, a sensing stem 30 is urged against the top of the foot 13. The dial indicator 29 has graduations for positive and for negative differential distances and preferably also one-half scale graduations of the actual differential distances as shown in FIG. 7. The indicator 29 has a usual knob 31 for setting the pointers of the indicator to desired reference graduations without changing the position of the sensing stem 30.

The supporting feet 14 and 15 are a part of an assembly 32 that functions as a movable clamp along the main body 12. The clamp comprises upper and lower parallel bars 33 and 34 respectively joined by side members 35 and 36 along the sides of the main body 12. A knob 37 positioned between the upper surface of the main body 12 and the lower surface of the upper bar 33 is connected to the lower surface of the bar 33 by threaded means such that the foot assembly 32 slides easily along the main body 12 when the knob 37 is turned in one direction and is locked in position when the knob is turned in the opposite direction. A depression 73 (FIG. 5) across the middle of the upper surface of the lower bar 34 receives the bottom of the main body for holding the bar 34 firmly in a transverse position. The upper bar 33 is only long enough to extend a short distance past each side of the main body 12 of the level, but the lower bar 34 is somewhat longer so that the legs 14 and 15 may be spaced at desired distances beyond opposite sides of the main body 12. Each side of the bar 34 has a groove 38 for receiving a tongue 41 of each of the sliding blocks 39 and 40. The upper ends of the legs 14 and 15 are turned through the middle of the bottom of the blocks 39 and 40 respectively and bear against the lower surface of the bar 34 to fasten the blocks.

As the assembly 32 with the feet 14 and 15 is moved toward the end of the body 12 having the foot 13, the weight of the opposite end of the body 12 tends to cause the body to tip about the feet 14 and 15. This tendency is overcome, even when the assembly 32 is brought close to the end of the window for the vial 16, by a counter weight 42 shown in FIG. 2. The weight 42 is rectangular and fits into the end of the rectangular tubing 12 that extends a short distance past the mounting 21 for the foot 13. A convenient way to fasten the weight 42 is to use a pin 43 driven from each side of the rectangular tubing 12, and the inner end of the weight 42 has a hole into which the pins 43 can be driven easily for removal. To facilitate using the level on curved surfaces, a spirit vial 45 is mounted transversely for positioning the feet 14 and 15 on a horizontal line. As shown in FIG. 1, a window is provided near the end of the rectangular tubing 12, and as shown in FIG. 2, the transverse vial 45 is set in the top of the counter weight 42 to be properly positioned beneath the window when the weight is inserted in the end of the rectangular bar 12.

By using sections of tubing as shown in FIG. 3, levels are made different lengths for leveling or aligning devices such as large pieces of machinery. The indicator 29 and the supporting leg 13 are mounted on a section 46, and the sensitive vial 16 is mounted on another section 47. The assembly 32 for the feet 14 and 15 is usually clamped to an end section 48. Since the weight of the sections will cause the level to sag slightly, the section 47 that contains the vial 16 is placed in the middle where the tangent of the lowest point of the curve is substantially horizontal while the feet 13–15 are on a level surface, regardless of the length and deflection of the level. Therefore, extending sections such as the sections 49 and 50 are positioned at opposite ends of the section 47, and the number of extending sections and their lengths are chosen such that the vial 16 is substantially midway between the foot 13 and the pair of feet 14 and 15. The adjacent sections are fastened together by a fixed pin 51 as shown across the section 46 and the latch 52 that is pivotally mounted on an operating pin 53 across the sides of the section 49. The pins 52 and 53 are near the bottoms of the respective sections where tension is required.

The operation of the latching assembly can be understood more clearly by referring to FIG. 4. One end of the operating pin 53 has a hexagonal socket 54 for receiving a hexagonal wrench. An eccentric part 55 that functions as a cam extends between the sides of the section 49 about the operating pin 53. One end of the latching member 52 is loosely pivoted about the center portion of the eccentric part 55. A latch-operating pin 56 is positioned a short distance from the latching member 52, extends radially from the operating pin 53 through the eccentric sleeve 55, and protrudes sufficiently to engage a latch-operating pin 57 that extends perpendicularly from the adjacent side of the latching member 52. A guiding plate 58 across the end of the section 49 has a central, vertical slot 59 through which the latching member 52 extends. Slot 59 is wide enough to permit the latching member 52 to move freely within the slot and the ends of the slot function as stops to limit the amount of rotation of the latching member 52. The end 60 opposite the pivotal end of the latching member 52 is shaped as a hook to fit firmly over the fixed pin 51. The lower end of the slot 59 acts as a stop for the latching member 52 such that when the sections 46 and 49 are uncoupled, the latching member 52 will not drop much below its usual latched position. The outer edge of the hook-shaped end 60 that first contacts the fixed pin 51 when the sections are being brought together, is inclined in a downward direction toward the pivotal end of the latching member 52, and the force of the pin 51 on the inclined surface pushes the end 60 of the latching member 52 upwardly so that the hook-shaped end 60 will fall over the fixed pin 51 as the sections 46 and 49 come nearly completely together. A portion of the guiding plate 58 is a close sliding fit within the end of the section 46 such that the ends of the sections fit together evenly.

The latch-operating pin 56 extends through the thicker portion of the eccentric part 55, and the end 60 of the latching member 52 extends farthest beyond the fixed pin 51 when the latch-operating pins 56 and 57 are in engagement. When sections that are joined together are to be disconnected, a hex wrench is inserted in the socket 54 to turn the eccentric sleeve 55 and the pin 56, the pin 56 pushing against the pin 57 to move the hook-shaped end 60 upwardly over the fixed pin 51. The sections 46 and 49 can then be moved apart. The latch-operating pins 56 and 57 usually do not have to be used when the sections 46 and 49 are to be connected. Since the latching member 52 is pivoted loosely on the eccentric sleeve 55, the weight of the latching member has caused it to be rotated until it contacts the bottom end of the slot 59. As the sections 46 and 49 are brought together, the outer inclined edge at the hook-shaped end 60 contacts the fixed pin 51 and rotates the latching member 52 until it falls over the fixed pin 51. The operating pin 53 is then turned to cause the eccentric part 55 to pull the hook of the latching member 52 tightly about the fixed pin 51.

Figure 5:
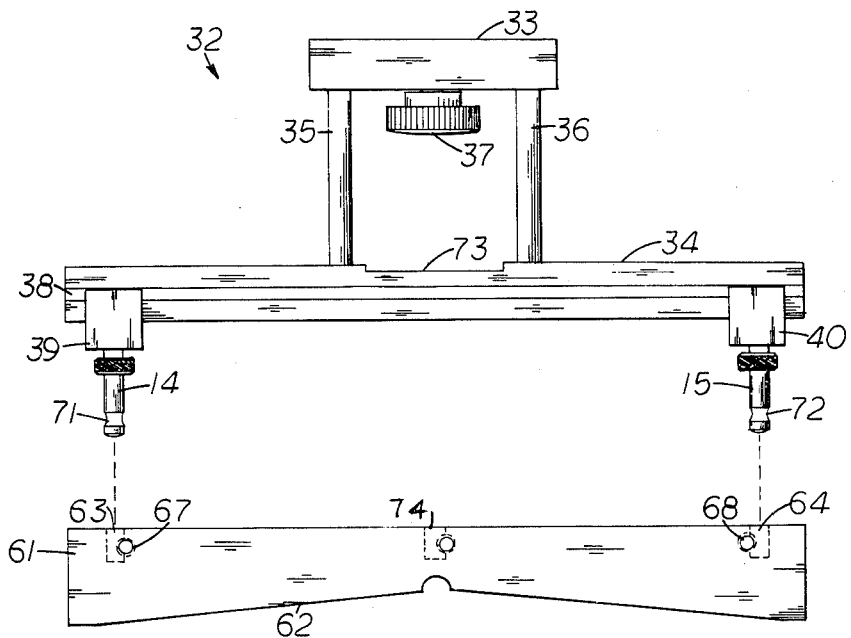
FIG. 5 is an end view of a foot assembly and an attachment for use on curved surfaces.
Figure 6:
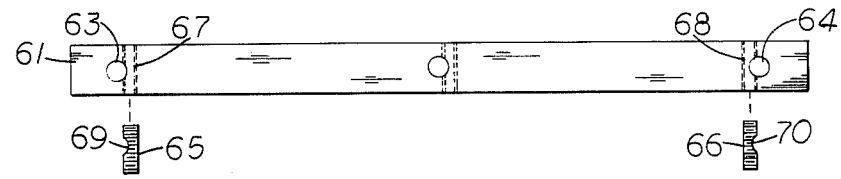
FIG. 6 is a top view of the attachment shown in FIG. 5.

When a surface along which a level is being positioned is curved, a pair of attachments, each similar to attachment 61 shown in FIGS. 5 and 6, may be desirable so that a particular lateral position of a level can be ascertained. By using the transverse vial 45 shown in FIGS. 1-3, the attachments 61 permit a level to be placed at a horizontal reference in a transverse direction. The lower surface 62 of each of the attachments 61 is an inverted V-shape for fitting over convex surfaces, and the lower corners are accurately machined to fit within concave surfaces.

Holes 63 and 64 near the respective ends of the upper surface of the attachment 61 have the required diameter for receiving the lower ends of the feet 14 and 15 respectively, and a hole 74 in the middle of the attachment 61 is provided for the foot 13. A convenient way of removably securing the attachment 62 to the legs 14 and 15 is to turn screws 65 and 66 into threaded holes 67 and 68, respectively. The axes of the holes 67 and 68 are perpendicular to the sides of the attachment 61 and are approximately through respective points on the circumference of the respective holes 63 and 64 such that a screw threaded into the holes would protrude into the holes 63 and 64. However, the screws 65 and 66 have notches 69 and 70 respectively in their walls intermediate the ends of the screws so that when the screws are turned and the notches face the respective holes 63 and 64, the holes are unobstructed for receiving the ends of the legs 14 and 15. Circular notches 71 and 72 near the ends of the respective legs 14 and 15 are positioned to be even with the screws 65 and 66, and when turned, the screws 65 and 66 protrude into the notches 69 and 70 to retain the legs 14 and 15, respectively. The screws 65 and 66 fit loosely enough in the respective notches 69 and 70, to permit the attachment 61 to move somewhat to conform to a surface upon which it is placed. Likewise, an attachment 61 is secured to the leg 13 by a screw associated with the hole 74 in the middle of the attachment. If desired, two different attachments with only one or two holes as required may be used in place of the attachment 61 having three holes.

The legs 13-15 make it possible to have the main body 12 of the level clear protruding structures situated between points of a surface to be leveled. When the intervening structure protrudes from the surface a greater distance than the length of the legs 13-15, accurately machined, cylindrical extensions can be attached to the legs. Each extension has an axial hole for receiving the end of one of the legs 13-15 and a screw corresponding to the screws 65 and 66 as described for the attachment 61.

The procedures are the same whether using the level of FIG. 1, that has a single section, or the level of FIG. 3, that has a plurality of sections. Usually before using the level, the pointers of the indicator 29 are set such that a mid-range reading is displayed while the level is in its first position for measurement. Before the indicator 29 is mounted in the level, the adjuster 31 is turned until the pointers of the indicator are positioned at the end of their range in a negative direction. After the indicator 29 is mounted over the leg 13, the knob 24 of the leg 13 is rotated until the pointers of the indicator 29 are at zero. The legs 14 and 15 have the proper length with respect to the length of leg 13 when it is adjusted to obtain a zero reading, to level the main body 12 providing the legs are resting on a level surface.

After adjusting the pointers of the indicator and the extension of the leg 13, the legs 13-15 are placed on the points to be leveled. Next the bubble of the vial 16 is accurately positioned at a single reference mark by adjustment of the knob 18.

The main body of the level is then turned end for end, and the knob 24 of the adjustable foot 13 is rotated until the bubble of the vial 16 is again precisely at the indicator mark. Since the sensing stem of the dial indicator 29 is following the top of the foot 13, the dial indicator is now displaying twice the distance by which one of the points on which the level is resting must be raised or lowered to make the points on a level line. The reading is noted on outer numbers of the scale of the dial indicator 29, and if the dial indicator is provided with inner one-half scale readings as shown in FIG. 7, the reading is noted on the one-half scale. The knob 24 of the foot 13 is then rotated until the pointers of the indicator 29 are positioned where the full-scale reading of the indicator is the same as the previously noted one-half scale reading. If the level rests on a single piece of equipment, the piece of equipment is tilted to change the heights by an amount equal to the half-scale reading. When the ends of the level are resting on different pieces of equipment, the separate equipments are raised or lowered, according to whether the readings on the indicator 29 were positive or negative, in an amount or in amounts to equal the one-half scale reading. The two points on which the level is resting are now quite precisely on a level line as indicated by the bubble of vial 16 being in its reference position. The degree of accuracy of the process can be checked by turning the level again end for end, and checking the position of the bubble. For the most precise work the procedure described above should be repeated carefully.

Although the level is most commonly used to level a surface, it may be used to incline a surface a desired amount within the range of the indicator 29. After the level has been turned end for end, the knob 24 of the leg 13 may be adjusted to provide a certain inclination as measured from the reading that is determined for making the surface level.

It is claimed:

1. A precision level comprising:
   an elongated rigid body, first and second leg assemblies attached to said body and spaced apart to support said body on respective first and second points for which the relative heights are to be determined with respect to horizontal, first level indicating means, a holder, said holder pivotally connected to said body and containing said first level indicating means, said holder being the type that is adjustable for precisely adjusting the tilt of said first level indicating means with respect to the longitudinal direction of said body,
   said first leg assembly having a first leg extending downwardly from one end of said body on a longitudinal axis thereof, adjusting means between said first leg and said body for precisely adjusting the distance said body is positioned above said first point,
   a differential distance indicator for displaying change of distance between two points, said differential distance indicator being connected between said first leg and said body to indicate precisely change in distance between said body and said first point,
   a counterweight fixed within said one end of said body, said one end of said body extending a short distance beyond said first leg assembly, said second leg assembly includes a bracket movable along said body to change the position of said second leg assembly, and said counterweight preventing tipping of said body about said second leg assembly while said second leg assembly is outside a predetermined short distance from said first leg assembly.

2. A precision level comprising:
   an elongated rigid body, first and second leg assemblies attached to said body and spaced apart to support said body on respective first and second points for which the relative heights are to be determined with respect to horizontal, first level indicating means, a holder, said holder pivotally connected to said body and containing said first level indicating means, said holder being the type that is adjustable for precisely adjusting the tilt of said first level indicating means with respect to the longitudinal direction of said body,
   said first leg assembly having a first leg extending downwardly from one end of said body on a longitudinal axis thereof, adjusting means between said first leg and said body for precisely adjusting the distance said body is positioned above said first point,
   a differential distance indicator for displaying change of distance between two points, said differential distance indicator being connected between said first leg and said body to indicate precisely change in distance between said body and said first point,
   said second leg assembly includes a cross member to be positioned transversely below said body, second and third legs having respective upper ends to be attached to said cross member and lower ends for supporting said level over said second point, means for attaching said upper ends of said second and third legs to said cross member at different desired distances apart,
   a first attachment for said first leg assembly and a second attachment for said second leg assembly to be used for supporting said body over a curved surface, said first leg having a lower end adapted to be attached to said first attachment, said first attachment having an upper edge to be attached to said lower end of said first leg, said second attachment having an upper edge to be attached to said lower ends of said second and third legs, a lower edge of each of said attachments having an inverted V-shape for contacting said curved surface, and fastening means for removably connecting said upper edges of said attachments to said lower ends of said respective legs.

3. A precision level as claimed in claim 2 wherein a second level indicating means is attached to said body for indicating when said body is level in a transverse direction.

4. A precision level comprising:
   an elongated rigid body, first and second leg assemblies attached to said body and spaced apart to support said body on respective first and second points for which the relative heights are to be determined with respect to horizontal, first level indicating means, a holder, said holder pivotally connected to said body and containing said first level indicating means, said holder being the type that is adjustable for precisely adjusting the tilt of said first level indicating means with respect to the longitudinal direction of said body,
   said first leg assembly having a first leg extending downwardly from one end of said body on a longitudinal axis thereof, adjusting means between said first leg and said body for precisely adjusting the distance said body is positioned above said first point,
   a differential distance indicator for displaying change of distance between two points to which said distance indicator is connected, said differential distance indicator being connected between said first leg and said body to indicate precisely change in distance between said body and said first point, said body comprising a plurality of elongated sections connected end to end fabricated from rectangular tubing, a latching member and a fixed pin at each junction where said sections are connected together, a rotative operating pin mounted horizontally across an end portion of one of said sections at a respective one of said junctions, said operating pin having an eccentric portion within said end portion of said one section, said latching member having one end pivotally connected to said eccentric portion and the other end shaped to be engaged about said fixed pin, said fixed pin being across an end portion of the other section close to said respective junction, first and second latch-operating pins, said first latch-operating pin extending radially from said operating pin, said second latch-operating pin extending outwardly from a side of said latching member, and means for rotating said operating pin to rotate said eccentric portion and revolve said first latch-operating pin into engagement with said second latch-operating pin, the movement of said second latch-operating pin after being engaged causing said other end of said latching member to be revolved relative to said fixed pin, and rotation of said eccentric portion in a particular direction while said one end of said latching member is engaged about said fixed pin and while said latch-operating pins are separated moving said latching member lengthwise with respect to said fixed pin to draw tightly together said sections at said respective one of said junctions.

* * * * *